Patented June 26, 1945

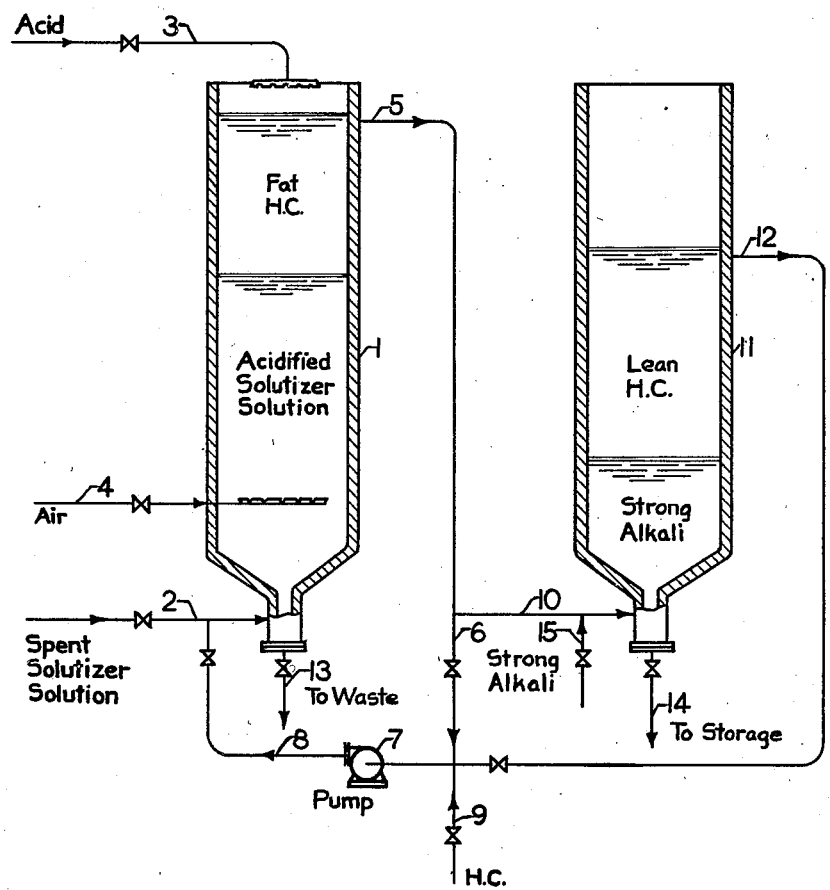

2,379,098

UNITED STATES PATENT OFFICE 2,379,098

SOLUTIZER RECOVERY PROCESS

Alan C. Nixon, Oakland, Calif., assignor to Shell Development Company, San Francisco, Calif., a corporation of Delaware Application February 11, 1944, Serial No. 522,209

9 Claims. (Cl. 252—192)

This invention involves the reconstitution of spent aqueous alkaline solutizer solutions. More particularly, it relates to the selective removal of the organic solutizer acids from spent solutizer solutions contaminated with harmful impurities.

The solutizer process is a process for extracting mercaptans and other weak organic acids contained in sour hydrocarbon distillates, such as gasoline distillates, with an aqueous alkaline solutizer solution wherein the solutizer is a salt of an organic solutizer acid. Among the compounds particularly suitable as solutizers for weak organic acids are alkali metal (particularly potassium) salts of certain acids—herein called solutizer acids—such as fatty acids having from 1 to 6 carbon atoms, or amino or hydroxy fatty acids having from 3 to 7 carbon atoms, or phenyl acetic acid, or dicarboxylic acids having from 5 to 11 carbon atoms in which the carboxyl radicals are separated by at least 2 carbon atoms, or naphthenic acids, or phenol or thiophenol or alkyl derivatives thereof or mixtures of the above, and particularly of mixtures with gasoline gum inhibitors soluble in aqueous caustic alkali solutions.

In principle, a solutizer solution could be used indefinitely by continuously regenerating it as by steam stripping or air oxidation. In practice, however, solutions used a long time tend to gradually accumulate certain impurities which may cause foaming or emulsification of the hydrocarbon oil under treatment. The addition of small amounts of organic sulfonic acids, or their alkali metal salts having molecular weights between about 200 and 1000, may reduce foaming and emulsification for some time. However, after a while the solution becomes so loaded with impurities that further addition of these defoamers and deemulsifiers has no effect. Foaming and emulsification either reduce the throughput through a given equipment due to retarded settling, or cause the carryover of valuable solutizer. Other impurities which tend to accumulate in the solutizer solution and decrease its effectiveness comprise gums, sludges, salts, etc. It is in the treatment of such contaminated solutions used continuously and for a long period that the reconstitution process of this invention is particularly useful. In many instances the solutizer solutions reconstituted by this process have a peculiar resistance to emulsification and foaming for a relatively long period of time.

The solutizing process and the various solutizers enumerated also have been described in a series of patents and patent applications, as well as in the general literature, for example: the Yabroff et al. United States Patents 2,149,379, 2,149,380, 2,164,851, 2,202,039, 2,223,798 and 2,229,995; Refiner and Natural Gasoline Manufacturer, May 1939, pages 171 to 176, and March 1940, pages 73 to 76; Industrial and Engineering Chemistry, vol. 32, pages 257 to 262, February 1940; Chemical and Metallurgical Engineering, vol. 47, pages 776 to 778, November 1940; Oil and Gas Journal, vol. 39, No. 26, pages 55 to 56, November 7, 1940; Oil and Gas Journal, vol. 42, No. 40, pp. 50–53, February 10, 1944; etc.

It is the object of this invention to reconstitute aqueous alkaline solutizer solutions in an efficient and economical manner. It is a further purpose of this invention to remove the valuable organic solutizer acids from spent solutizer solutions without removing the undesirable and harmful accumulated impurities present in such solutions which cannot be removed by ordinary stripping or oxidation regeneration. It is a still further purpose of this invention to produce a reconstituted solutizer solution having little if any emulsifying and foaming tendencies.

Generally the process of this invention involves the steps of: (a) acidifying spent solutizer solution, wherein the solutizer comprises a salt of a solutizer acid, with an acid stronger than the latter to liberate the solutizer acid, (b) extracting the liberated solutizer acid with a hydrocarbon liquid, and (c) contacting the resulting hydrocarbon liquid containing the solutizer acid with a strong aqueous alkali metal hydroxide solution, whereby a fresh solutizer solution is built up. The hydrocarbon liquid which is liberated in step c may be recycled and used again in step b.

The acid used in neutralizing the spent solutizer solution must be stronger than the organic solutizer acid used therein and is, preferably, an aqueous solution of a mineral acid, such as $H_2SO_4$, HCl, $HNO_3$, $H_3PO_4$, etc., having a concentration of between about 40% and 80% and preferably between about 50% and 60.

The hydrocarbon employed to extract the liberated solutizer acids should contain less than 50% aromatics or have a specific dispersion of less than about 130 (see Industrial and Engineering Chemistry, vol. 29, No. 3, March 1937, pp. 319–335). This hydrocarbon liquid should not be so volatile as to be lost from an open vessel and should not be so viscous that it would be difficult to pump or to mix with an aqueous solution. Suitable hydrocarbon liquids are relatively non-aromatic naphthas, gasolines, kerosenes, gas oils, light lube oils, etc.

In describing this process in more detail, reference is had to the accompanying drawing wherein a flow diagram of one method in carrying out the process is disclosed.

Referring to this flow diagram, the agitator 1 is partially filled with an aqueous solution of an acid. It is advisable to add to this acid about an equal volume of the hydrocarbon liquid described above in order to dissipate some of the heat generated when the alkaline spent solutizer solution is contacted with the acid. The spent aqueous alkaline solutizer solution to be reconstituted is then slowly introduced into agitator 1 through valved line 2 in an amount sufficient to insure the liberation of substantially all of the organic solutizer acids from the spent solution. This is effected by not permitting the pH of the aqueous phase from rising above 5 and preferably keeping it at 2 or 1. The order in which the spent solutizer solution, acid, and hydrocarbon are introduced into the agitator 1 is immaterial. This acidification of the spent solutizer solution is necessary in order to extract the liberated solutizer acids with the above mentioned hydrocarbon liquid, because the free organic solutizer acids are more soluble in hydrocarbons than water and their alkaline salts are more soluble in water than in hydrocarbons.

It is desirable to agitate the ingredients in agitator 1 before extracting the liberated organic solutizer acids. This agitation may be carried out by several means, such as by blowing air through valved line 4 into the mixture; or by circulation of the hydrocarbon liquid from the top of the aqueous acidified solution through lines 5 and 6, pump 7 and valved line 8, into the bottom of the agitator 1 to pass up through the aqueous phase; or by mechanical stirrers in the agitator 1 (not shown); or by any combination or sequence of these means, as desired. If air is used, it has the advantage of oxidizing some harmful emulsifiers and foamers so that they will be converted to a form less easily extracted by the hydrocarbon liquid.

After the spent solutizer solution has been acidified and the organic solutizer acids have been liberated, the solution is allowed to stand from 1 to 24 hours but preferably 2 to 3 hours, so that most of the precipitated salts may settle.

The fat hydrocarbon phase containing at least some of the liberated acid is withdrawn through line 5 and valved line 10 into the bottom of agitator 11. This agitator 11 contains a strong, and preferably about 6–15 Normal, aqueous alkaline metal hydroxide solution (corresponding to that in the spent solutizer solution), previously introduced through valved line 15. As the fat hydrocarbon liquid contacts this alkali metal hydroxide solution, the organic solutizer acids react with the alkali metal hydroxide to form salts which remain in the aqueous hydroxide solution. The resulting lean hydrocarbon liquid is then recirculated by pump 7 through valved lines 12 and 8, and through agitator 1 in order to extract more liberated solutizer acids. Make-up hydrocarbon liquid may be introduced into the system through valved line 9. This recirculation is continued until substantially all the solutizer acids have been transferred from agitator 1 to agitator 11, at which time the circulation is stopped and the liquids in agitators 1 and 11 are allowed to settle. The aqueous layers from the two agitators are withdrawn separately through valved lines 13 and 14. The aqueous phase from agitator 1 is usually discarded since it contains mostly alkali metal salts of a strong acid, some free mineral acid, and substantially all the harmful impurities in the spent solutizer solution. The aqueous phase from agitator 11 comprises reconstituted solutizer solution and goes to storage. If the reconstituted solutizer solution is not of the proper strength for direct use in the solutizer plant, it may be adjusted by the addition of fresh aqueous alkali metal hydroxide, water, and/or fresh organic solutizer acid, as may be required.

If desired, agitators 1 and 11 may be replaced by extraction towers containing baffles, packing, etc.

For simplicity, the drawing does not show auxiliary pumps, pipes, valves, tanks, etc., which may be necessary in carrying out this process, the proper placement of which will be evident at once to those skilled in the art.

*Example I*

A sample of a contaminated solutizer solution (comprising potassium hydroxide, potassium isobutyrate, and potassium alkyl phenolate) which had been used over a period of several months in the extraction of mercaptans from cracked gasoline distillates was acidified with 30% sulfuric acid to a pH of 1–2. The thus liberated isobutyric acid and alkyl phenols were extracted with kerosene containing less than 2% by volume aromatics and having a boiling range between 300° F. and 385° F. Three successive extractions of the sample were made with an amount of kerosene equal in volume to that of the sample. The amount of alkyl phenols and isobutyric acid recovered from each extraction is shown in the table below:

|  | Isobutyric acid | | Alkyl phenols | |
| --- | --- | --- | --- | --- |
|  | Grams | Percent b. w. | Grams | Percent b. w. |
| Charge (50 ml.): |  |  |  |  |
| Solutizer solution | 6.2 | 100 | 5.4 | 100 |
| Recovery: |  |  |  |  |
| Extract No. 1 | 3.2 | 51.7 | 2.8 | 51.8 |
| Extract No. 2 | 0.7 | 11.3 | 0.8 | 14.8 |
| Extract No. 3 | 0.4 | 6.4 | 0.4 | 7.4 |
| Total recovery | 4.3 | 69.4 | 4.0 | 74.0 |

*Example II*

Approximately 25 barrels of kerosene was charged to an agitator. This was followed by the addition of diluted sulfuric acid of 50% to 60% concentration. Next about 25 barrels of contaminated solutizer solution, having the properties shown in the table below, was slowly pumped into the tower through the bottom to produce an acidified solutizer solution having a pH of approximately 1. After the tower was charged, the solution was allowed to stand overnight so that the salts that were formed in the process could settle. The following day kerosene was pumped slowly into the agitator through the bottom and the fat kerosene containing the extracted free solutizer acids was allowed to flow from the top of the agitator into the bottom of another tower which contained 48° Bé. potassium hydroxide. In the second tower the isobutyric acid and the alkyl phenols were converted to their potassium salts and the resulting lean hydrocarbon was recycled through the first tower to extract more of the liberated solutizer acids, as has been previously described. The hydrocarbon fraction was circulated for 24 hours. The aqueous phase from the first tower was dropped to the sewer.

The resulting caustic phase was withdrawn and charged to a solutizer plant. After it had been in use in a solutizer plant for 24 hours a sample was taken and its properties were compared to that of a sample of the contaminated solution, as shown in the table below:

|  | Contaminated solutizer solution | Reconstituted solutizer solution |
| --- | --- | --- |
| Specific gravity, °Bé | 38.8 | 38.9 |
| KOH, normality | 3.41 | 6.0 |
| Potassium isobutyrate, normality | 1.70 | 1.60 |
| Potassium alkyl phenolate, normality | .91 | .98 |
| Sodium ion concentration, normality | 1.34 | .26 |

The contaminated solutizer solution had caused serious foaming and emulsions in the solutizer plant, the difficulties starting almost immediately after charging the fresh solution. It was treated repeatedly with a defoaming and de-emulsifying agent until it would no longer respond to further additions of this agent. In contrast, the reconstituted solutizer solution caused no emulsion or foaming difficulties for approximately 7 months after it had been introduced into the solutizer plant.

This may have been due to a selective extraction of defoaming agents, together with the solutizer acid, while at the same time rejecting foam producers.

I claim as my invention:

1. In a process for reconstituting a spent aqueous alkaline solutizer solution wherein the solutizer is a salt of an organic solutizer acid, said spent solution being contaminated with harmful impurities including foaming and emulsifying agents, the steps comprising acidifying said spent solution, contacting the resulting acidified solution with a hydrocarbon liquid containing less than 50% aromatics, withdrawing the resulting hydrocarbon liquid, and contacting the latter with an excess of a strong aqueous alkali metal hydroxide solution whereby said solutizer acid is absorbed in said hydroxide solution to produce the reconstituted solutizer solution.

2. The process of claim 1, wherein said solutizer acid comprises isobutyric acid and said strong alkaline solution is potassium hydroxide.

3. The process of claim 1 wherein said solutizer acid comprises a phenol.

4. The process of claim 1 wherein said hydrocarbon liquid is kerosene.

5. In a process for reconstituting a spent aqueous alkaline solutizer solution wherein the solutizer is a salt of an organic solutizer acid, said spent solution being contaminated with harmful impurities including foaming and emulsifying agents, the steps comprising acidifying said spent solution, contacting the resulting acidified solution with a lean hydrocarbon liquid containing less than 50% aromatics, withdrawing the resulting fat hydrocarbon liquid containing solutizer acid, contacting the latter with an excess of a strong aqueous alkali metal hydroxide solution whereby said solutizer acid is absorbed in said hydroxide solution to produce the reconstituted solutizer solution and recycling the resulting lean hydrocarbon liquid to further contact said acidified solution.

6. In a process for reconstituting a spent aqueous alkaline solutizer solution wherein the solutizer is a salt of an organic solutizer acid, said spent solution being contaminated with harmful impurities including foaming and emulsifying agents, the steps comprising acidifying said spent solution to liberate said organic solutizer acid, extracting the resulting liberated acid from said acidified spent solution with a hydrocarbon liquid containing less than 50% aromatics whereby an aqueous layer and a hydrocarbon layer are produced, said hydrocarbon layer containing said organic solutizer acid free from said harmful impurities, separating said layers, contacting said hydrocarbon layer with an excess of a strong aqueous alkali metal hydroxide solution whereby said organic solutizer acid is absorbed in said hydroxide solution to produce the reconstituted solutizer solution.

7. In a process for reconstituting a spent aqueous alkaline solutizer solution wherein the solutizer is a salt of an organic solutizer acid, said spent solution being contaminated with harmful impurities including foaming and emulsifying agents, the steps comprising acidifying said spent solution to liberate said organic solutizer acid, contacting the resulting liberated acid with a hydrocarbon liquid containing less than 50% aromatics, agitating said acidified spent solution and said hydrocarbon liquid and then allowing them to settle whereby an aqueous layer and a fat hydrocarbon layer are produced, said fat hydrocarbon layer containing said organic solutizer acid free from harmful impurities, separating said layers, and contacting said fat hydrocarbon layer with an excess of a strong aqueous alkali metal hydroxide solution whereby said solutizer acid is absorbed in said hydroxide solution to produce the reconstituted solutizer solution.

8. The process of claim 7 wherein the agitation is in part by air blowing.

9. In a process for reconstituting spent aqueous alkaline solutizer solution wherein the solutizer is a salt of an organic solutizer acid, said spent solution being contaminated with harmful impurities including foaming and emulsifying agents, the steps comprising acidifying said spent solution to liberate said organic solutizer acid, contacting the resulting liberated acid with a lean hydrocarbon liquid containing less than 50% aromatics, agitating said acidified spent solution and said hydrocarbon liquid and then allowing them to settle whereby an aqueous layer and a fat hydrocarbon layer are produced, said fat hydrocarbon layer containing said organic solutizer acid free from harmful impurities, separating said layers, contacting said fat hydrocarbon layer with an excess of a strong aqueous alkali metal hydroxide solution whereby said solutizer acid is absorbed in said hydroxide solution to produce the reconstituted solutizer solution and said lean hydrocarbon liquid, and recycling said lean hydrocarbon liquid to further extract more liberated acids from said acidified spent solution.

ALAN C. NIXON.